Patented May 20, 1952

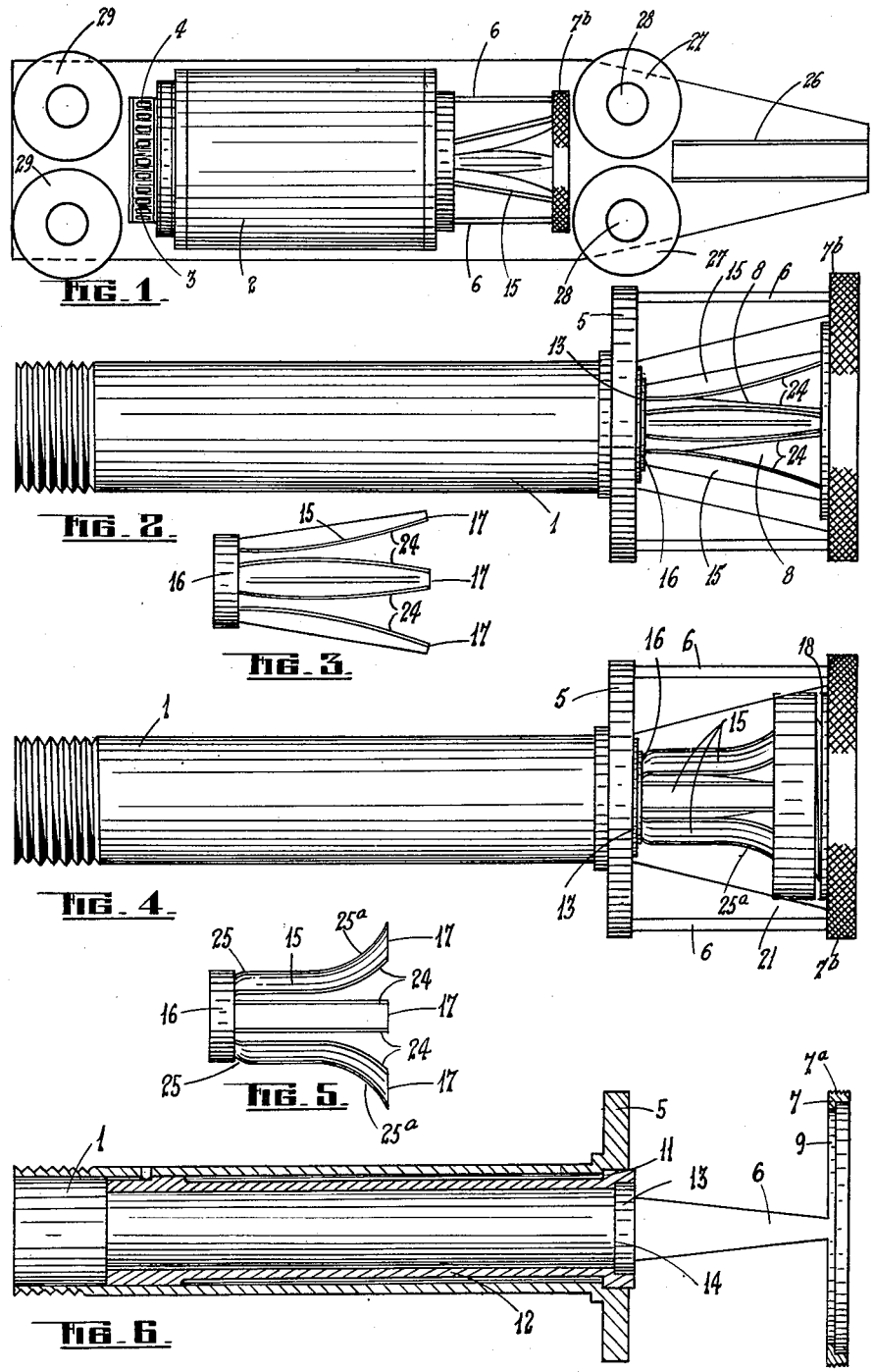

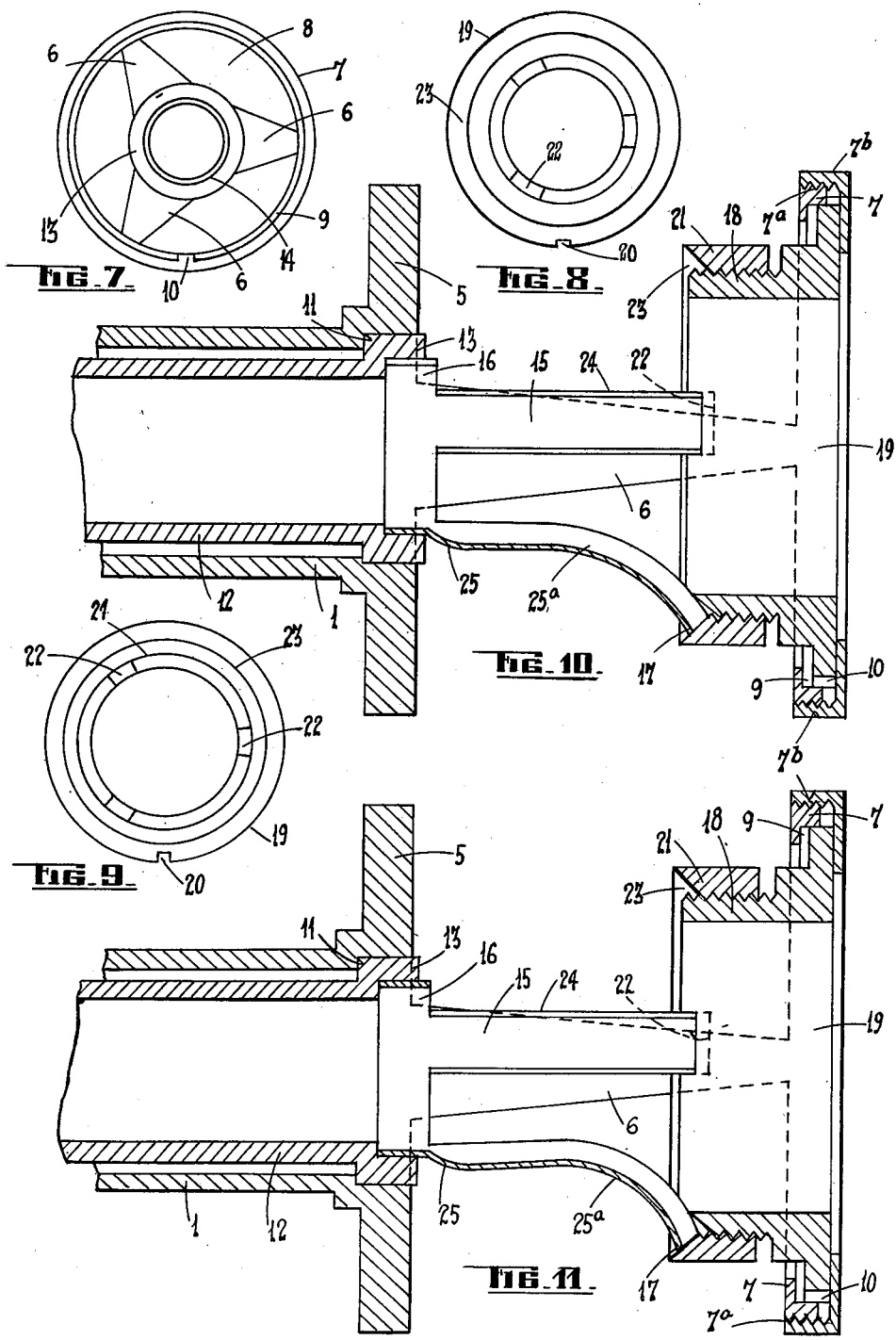

2,597,099

UNITED STATES PATENT OFFICE 2,597,099

MEANS FOR CUTTING DOWELING AND LIKE ARTICLES

Ralph Harwood Hayhurst, Auckland, Auckland, New Zealand

Application August 9, 1949, Serial No. 109,262
In New Zealand August 11, 1948

6 Claims. (Cl. 144—12)

This invention relates to means intended for use in making dowelling and like articles such as from wood or like turnable material whereby articles being cylindrical in length are produced.

In previous means for cutting dowelling and like articles being cylindrical in length, separate cutter heads have been provided for each cylindrical size or diametrical size of dowelling to be cut and each head had a set of removable blades, and after removal of the blades for sharpening or other purposes, considerable time and difficulty has been involved in re-setting the blades in each head and also in procuring the correct or desired adjustment to ensure smooth and clean cutting of the material and in procuring a dowelling having an accurate cylindrical or diametrical size.

An object of this invention is to provide an improved means for use in making dowelling and like articles wherein one cutter head only is necessary and such head is adapted to receive and to hold various sizes of cutters so that one cutter can be removed from the cutter head and another or a smaller or larger cutter can be inserted and a short time only is required to make the desired change.

A further object of this invention is to provide an improved means for use in making dowelling and like articles wherein a small adjustment in the size of the cutter can be made while it is being inserted in the cutter head or while it is in the cutter head.

Thus, in this invention, the objects include provision of an improved cutter head with improved cutters which are cheap in initial costs and running costs, are easily and quickly assembled ready for use, are effective while in use and easily and quickly adjusted in size of cylindrical or diametrical cut, or changed from one size to another.

According to this invention, the improved means for making dowelling and like articles comprises a cutter head capable of being mounted in bearings and turned by its shaft at a desired high speed, a sleeve in the outer end of the shaft of the cutter head, a cutter situated between the sleeve and a holed cap which is engaged in the outer end of the cutter head, and a knurled keeper cap screw threaded on the end of the cutter head to secure the cutter in the cutter head.

Further according to this invention, the improved means for making dowelling and like articles comprises a cutter head capable of being mounted in bearings and turned by its shaft at a desired high speed, a sleeve in the outer end of the shaft of the cutter head, a cutter situated between the sleeve and a holed cap engaged in the outer end of the cutter head, a collar screw threaded on the holed cap and engaging the cutter to adjust the size of the cutter and a knurled keeper cap screw threaded on the end of the cutter head to secure the cutter in the cutter head.

The invention will now be further described with reference to the accompanying drawings, in which:

Figure 1 is a plan view of a machine having the improved means with one form of the invention included therein, Figure 2 is a cutter head removed from the machine and having a straight cutter and sleeve indicated therein, Figure 3 is a straight cutter removed from the cutter head, Figure 4 is a cutter head removed from the machine and having an adjustable cutter and sleeve indicated therein according to another form of the invention, Figure 5 is an adjustable cutter removed from the cutter head, Figure 6 is a sectional elevation of the body of the cutter head with the knurled nut, holed cap and cutter removed therefrom, Figure 7 is an end view of Figure 6 in full, Figure 8 is the inner side of a holed cap according to Figure 1, Figure 9 is the inner side of a holed cap according to Figure 4, Figure 10 is an enlarged part sectional view of the body, sleeve recess, cutter, holed cap and knurled nut, and illustrates the adjustment of the cutter by screwing the ring on the boss of the holed cap, Figure 11 is an enlarged part sectional view of the sleeve recess, body, cutter, holed cap and knurled nut, and illustrates the adjustment of the cutter by screwing the ring away from the holed cap.

Referring to the drawings, in this invention, the cutter head has a hollow shaft 1 which is turnably mounted in bearings (not shown) in the housing 2 and the shaft 1 is driven at a desired high speed in either direction by a reversible motor or through reverse gearing coupled such as by chain 3 and sprocket wheel 4 to the inner end of the shaft 1. The outer end of the shaft 1 supports the body of the cutter head which comprises a flange 5 having concentric arms 6 extending out lengthwise, and an outer ring 7 concentrically disposed on the outer ends of the arms 6 so that spaces 8 are left between the arms 6. The ring 7 has an external screw thread at 7a and the ring 7 has an inner annular recess 9 in which is a stop 10 formed across the recess 9. The inner surface of the outer end of the hollow shaft 1 is provided with an annular groove or recess 11 defining an internal shoulder and such groove or recess 11 receives and supports a sleeve 12.

Thus in the outer end of the hollow shaft 1 is fitted the sleeve 12 which has an enlarged outer end 13 to fit into the annular groove or recess 11 in the outer end of the hollow shaft 1, and the sleeve 12 has the inner surface of its outer end formed as an annular groove or recess 14 defining an internal shoulder and such groove or recess 14 receives and supports an end of a cutter 15.

In this invention a cutter 15 is disposed concentrically in the body of the cutter head, with an inner end of a cutter ring 16 engaged in the annular groove or recess 14 of the sleeve 12, and distal ends 17 of the cutter 15 engage a holed cap 19 disposed concentrically in the annular recess 9 of the ring 7 of the body of the cutter head, and the cap 19 has a cut out 20 for engagement with the stop 10 in such annular recess 9. A keeper cap or knurled nut 7b threaded on the ring 7 has an internal flange that holds the holed cap 19 in the ring 7.

In a simple form of this invention as shown in Figures 1, 2 and 3 the cutter 15 comprises a base ring or holed sleeve 16 forming the inner end of the cutter 15 and the cutter 15 has arms extending outwards concentrically from one annular edge of the ring or sleeve 16 to distal ends 17 so that the cutter arms are made integral with the ring or sleeve 16 and the cutter arms splay outwardly to their distal ends 17, which engage in notches in the inner surface of the holed cap 19, Figure 8. Thus the distance between the cutter arms of each cutter 15 increases progressively from the ring or sleeve 16 to their distal ends 17. The bore of the ring or sleeve 16 is slightly larger in diameter than that of the cylindrical or diametrical size of dowelling to be produced by a cutter 15. The arms of the cutter 15 are preferably three in number and are evenly spaced apart around the ring or sleeve 16 and each cutter arm is preferably made in a substantially semi-circular cross section so that two cutting edges 24 to each arm are faced inwardly. Both cutting edges 24 of each arm are sharpened to present a cutting edge 24 when the cutting arms are reversed in rotation and thus while one cutting edge 24 of each arm of a cutter 15 is cutting then its companion cutting edge forms and acts as a "keeper edge." The cutting edges 24 extend along the full length of each cutter arm from the ring or sleeve 16 to distal ends 17 with the smallest distance between the arms and opposed cutting edges 24 nearest to the cutter ring or sleeve 16.

Another form of cutter according to this invention as shown in Figures 4 and 5 comprises a base ring or holed sleeve 16 forming the inner end of the cutter 15 and cutter arms of the cutter 15 extending outwardly and concentrically from one annular edge of the ring or sleeve 16 and the arms of the cutter 15 are made integral with the ring or sleeve 16 as mentioned above; but in this cutter 15, the cutter arms are bulged at 25 outwards and strengthened adjacent to the ring or sleeve 16; and then the cutter arms are splayed apart and curved at 25a outwardly to their distal ends 17 which are then capable of being sprung inwards and outwards to alter the distance between opposed cutter arms. The bulge 25 outwards in each arm of a cutter 25 near the ring or sleeve 16, gives added strength to each arm and gives increased clearance between the arms of a cutter 15 and dowelling being made by the cutter 15 to prevent friction, particularly while shavings are being discharged from the cutter head through spaces 8. In this form the arms of the cutter 15 are made substantially semi-circular in cross-section and the cutting edges 24 are made in the edges of each arm of the cutter 15 and are faced inwardly to present cutting edges 24 to material passed centrally through the cutter 15, and while one cutting edge 24 of each arm of the cutter 15 is cutting then its companion cutting edge 24 forms and acts as a "keep" edge. The cutting edges 24 extend along the full length of and therefore along the curve of each arm of a cutter 15 and terminate with the smallest distance between the arms and opposed cutting edges nearest to the cutter ring or sleeve 16. In this form of the invention the holed cap 19 has a boss 18, Figures 9 and 10 and the outer surface of the boss 18 of the holed cap 19 is screw threaded and a collar 21 having an inner screw thread can be screwed on to the boss 18. The outer edge of the boss 18 of the cap 19 is castellated and the edge 22 of each low part is bevelled outwards so that the distal ends 17 of the cutter 15 bear upon the bevel edge 22; and the outer edge 23 of the collar 21 is bevelled inwards so that the distal ends 17 of a cutter 15 can be engaged, and by forcing the distal ends of a cutter 15 apart so an adjustment in a cutter 15 can be varied as to the depth of cut made by a cutter 15. Thus the outer or distal ends 17 of each splayed and curved arm of each cutter 15 engage in the bevelled edge 22 of the low parts of the castellation of the boss 18 of the cap 19 and the collar 21 on the boss 18 can be screwed on the cap 19 to force arms of a cutter 15 apart to increase the diameter of the article made by the cutter 15, or the collar 21 can be screwed away from the cap 19 towards the outer end of the boss 18, to close the distance between opposed arms of the cutter 15 and to decrease the diameter of the article made by a cutter 15 while in use.

The material for making dowelling is supplied to the cutting head and fed into and through the cutter 15 and between the latter's arms as it is guided over a lengthwise support 26; then through removable rollers 27 which are turnably mounted on posts 28 and which hold the material from twisting or turning while the material is being cut to desired cylindrical or diametrical size according to the cutter 15 inserted in the head, and according to the adjustment given to the cutter 15 by the position of the collar 21 on the boss 18 of the cap 19. A change in the cutter 15 is made by releasing the knurled cap 7b from the ring 7 of the body of the cutter head and then withdrawing the cap 19 and cutter 15 and its sleeve 12 from within the body of the cutter head; and, thereafter, another sleeve 12 and its cutter 15 with appropriate holed cap 19 can be inserted within the body of the cutter head and a desired adjustment of the arms of the cutter 15 can then be made where the cutter 15 is one having outwardly curved arms, by screwing the ring 21 on the boss 18 of the holed cap 19.

Thus, in operation, the head with the cutter 15 therein is rotated and material to be cut is fed into the open end of the head through the holed cap 19 until the material encounters the cutting edges 24 of the arms of the cutter 15 and the material is cut by such cutting edges 24 to a round cross section as the length of the cutting edges 24 shapes the material to a dowelling by the time the material has moved from the distal ends 17 of the cutter 15 to the sleeve or ring 16 of the arms of the cutter 15 while gradually diminishing the size of the material to form dowelling; and the shavings or turnings are discharged through the space 8 between the concentric arms 6 of the body of the head, and the dowelling emerges from the hollow shaft 1 past the guide rollers 29.

What I do claim and desire to obtain by Letters Patent of the United States of America is:

1. A rotatable reducing cutter making dowelling and the like including a rotatable hollow shaft, a cutter head embodied with one end of said shaft and rotatable therewith, a sleeve within said hollow shaft, an apertured cap carried by the outer end of said cutter head and rotatable therewith, a cutter including a plurality of blades extending generally axially of the sleeve, said blades terminating in free ends and said cutter disposed between said sleeves and said cap and means connecting the free ends of said blades to said cap whereby the cutter rotates with the cap and thereby with the shaft and receives and reduces material passed axially through the cap, the cutter and the sleeve.

2. A rotatable reducing cutter as defined in and by claim 1 wherein the said cutter includes a ring engaging in the outer end of said sleeve and said blades extend outwardly of said ring and wherein said apertured cap is provided with notches on the inner surface thereof extending axially of said shaft and receiving the outer ends of said blades and said cutter head embodying a flanged ring longitudinally spaced from the outer end of said shaft and receiving said apertured cap, said ring being externally threaded and a flanged internally threaded nut engaging the threads on said ring with the flange engaging and retaining the apertured cap against axial displacement relative to the cutter head.

3. A reducing cutter for making dowelling and the like including a rotatable hollow shaft, a cutter head embodied with the outer end of said shaft and driven thereby, said cutter head including an outer annular member longitudinally spaced from the end of said shaft and said outer member having an internal flange, the outer end of said shaft having an internal shoulder thereon, a flanged sleeve within said shaft with the flange engaging with the shoulder at the outer end of said shaft, said sleeve having an internal shoulder thereon, a flanged apertured cap within the flanged outer element of the cutter head and means coupling said cap for rotation with said element and said shaft, said cap being castellated on its inner side, a cutter member including a plurality of blades disposed within the said sleeve in engagement with the shoulder therein and with the blades extending outwardly of the sleeve toward the cap with the distal ends of the blades disposed in the castellated inner surface of the cap, and a knurled nut in threaded engagement with said annular element of the cutter head for retaining the cap within and against displacement relative to the said annular element of the cutter head.

4. A reducing cutter as defined in and by claim 3 and wherein said annular cap includes a hollow boss extending toward the outer end of said shaft, the inner surface of said boss constituting the inner surface of said cap and said inner surface being castellated, a collar in threaded engagement with the outer surface of said boss, the base of the castellated surface on said boss being beveled outwardly and the outer surface of the said collar being beveled inwardly and the distal end of said blades cooperating with the said beveled surfaces so that as said collar is axially displaced along the boss the position of the blades is varied relative to the axis of the sleeve to vary the diameter of the cut.

5. A cutter of the character described including a rotatable cutter head, a sleeve mounted in said head and provided with an internal shoulder adjacent the outer end thereof, a cutter element including an annular ring mounted within the outer end of said sleeve and in engagement with said shoulder, said ring having a plurality of cutter arms splayed apart and extending outwardly and concentrically of the outer edge of said ring and terminating in distal ends, an apertured cap mounted in said cutter head, means embodied with said cap and cooperating with said arms to transmit rotation of said cap to said arms, and each arm having cutting edges provided along the length thereof.

6. A cutter of the character described including a cutter head, a sleeve mounted in said head and provided with an internal shoulder, a cutter element including an annular ring mounted within the outer end of said sleeve and in engagement with said shoulder, said ring having a plurality of cutter arms extending outwardly and concentrically from the outer edge of said ring, said arms being bulged outwardly and strengthened adjacent the ring and then splayed apart and curved outwardly to their distal ends, and means for moving the distal ends concentrically in relation to one another to alter the distance between opposed cutter arms including an apertured cap mounted in the cutter head including a boss extending toward the said ring, means connecting the arms to said ring and a collar axially movably engaging said boss and including a beveled surface engaging the terminal ends of said arms so that axial movement of the collar in one direction forces the arms inwardly toward one another and axial movement of the collar in the opposite direction permits said arms to move outwardly relative to one another.

RALPH HARWOOD HAYHURST.

REFERENCES CITED

The following references are of record in the file of this patent:

UNITED STATES PATENTS

| Number | Name | Date |
| --- | --- | --- |
| 887,148 | Tannewitz | May 12, 1908 |
| 2,031,903 | Riddick | Feb. 25, 1936 |